Sept. 16, 1930.  E. A. PERRIN  1,775,783
SINGLE SCREW RAPID HELICOPTER
Filed Oct. 20, 1927   8 Sheets-Sheet 1

INVENTOR:
Edouard Alfred Perrin
BY
ATTORNEY

Sept. 16, 1930.  E. A. PERRIN  1,775,783
SINGLE SCREW RAPID HELICOPTER
Filed Oct. 20, 1927  8 Sheets-Sheet 4

INVENTOR:
Edouard Alfred Perrin
BY
ATTORNEY

Sept. 16, 1930.  E. A. PERRIN  1,775,783
SINGLE SCREW RAPID HELICOPTER
Filed Oct. 20, 1927   8 Sheets-Sheet 5

INVENTOR:
Edouard Alfred Perrin
BY
ATTORNEY

Patented Sept. 16, 1930

1,775,783

UNITED STATES PATENT OFFICE

EDOUARD ALFRED PERRIN, OF LE VESINET, FRANCE

SINGLE-SCREW RAPID HELICOPTER

Application filed October 20, 1927, Serial No. 227,553, and in France October 22, 1926.

The object of my invention is to provide a flying machine of the helicopter type designed to permit: vertical climbing or descent, vertical taking off and landing, rapid travelling either horizontally or slantwise according to the pilot's discretion, braked coming down and landing with the engine inoperative, all these results being obtained through using a single screw for both elevating and propelling, with variable pitch, and mounted on a fuselage provided with certain hereinafter described attachments or associated parts.

Employment of a single screw for helicopter supporting was mostly discarded on account of incoercible rotation of the fuselage and of the motive system when the latter is operative. Air resistance, opposing rotation of the screw tends to swing or turn the machine in the opposite direction to that in which the screw is rotated. This drawback has been done away with by using two screws rotated in opposite directions. But then transmission is necessarily complicated and the fuselage or frame that carries the transmission mechanism is rendered heavier to ensure the strength which it must have to resist the internal stresses, at times intensive, of aerodynamic or gyroscopic origin, produced by the action of either screw on the other screw.

With the machine which is the subject of my invention, there is attached to the fuselage a device located adjacent the screw and adapted to be adjusted by the pilot in such a way that the action of air on said device will exactly counterbalance the action of air on the screw blades as regards the component normal to the axis of rotation. This device will be termed a "deflector", its duty being to act on the air currents or stream lines created by the screw in such a way as to deflect their trajectory or path in the direction and with the intensity required to avoid any tendency to rotation of the fuselage. The deflector system can, indeed, be applied exclusively above or below the screw or exclusively to a portion of the blade-swept surface, provided, however, said portion amounts to a pretty large proportion of the whole surface swept, failing which it would no longer be possible to ensure counterbalancing of the tendencies to fuselage rotation.

Moreover, if the above-defined deflector device is such as to act on a sufficiently-large body of air, the pilot can so adjust it that the action of air on the deflector will overcome the balancing of the screw-actuating torque; the surplus can, with a suitable arrangement, exceed one third of the value of said torque. According to my invention, this property is availed of in order to obtain, under the pilot's control, setting of the machine in any desired direction, and, when travelling ahead, steering of the machine along her trajectory.

On the other hand, employment of a single screw necessitates special arrangements for stabilizing the machine, since the gyroscopic reactions of the screw are no longer neutralized by, say, an equivalent screw rotating in inverse direction. With the machine which is the subject of my invention, said gyroscopic reactions are utilized concurrently with aerodynamic reactions in order to achieve stabilization of the machine both during vertical lift and during rapid translation.

Lastly, the gyroscopic-aerodynamic deflector and stabilizer devices, losing some of their efficiency during rapid translation, are, with the machine designed according to my invention, reinforced with vertical fins mounted on the fuselage and the action of which gradually becomes substituted for said deflector and stabilizer devices in proportion to the translation speed at which the machine is driven.

The features characteristic of my invention comprise, broadly:

1. In order to avoid rotation of the engine frame while the engine is driving the screw, the combination with the supporting or lifting screw or propeller of a deflector device adapted to deflect the path of all or of some of the air currents that flow through the screw.

Figures 5, 6, 7, 8:
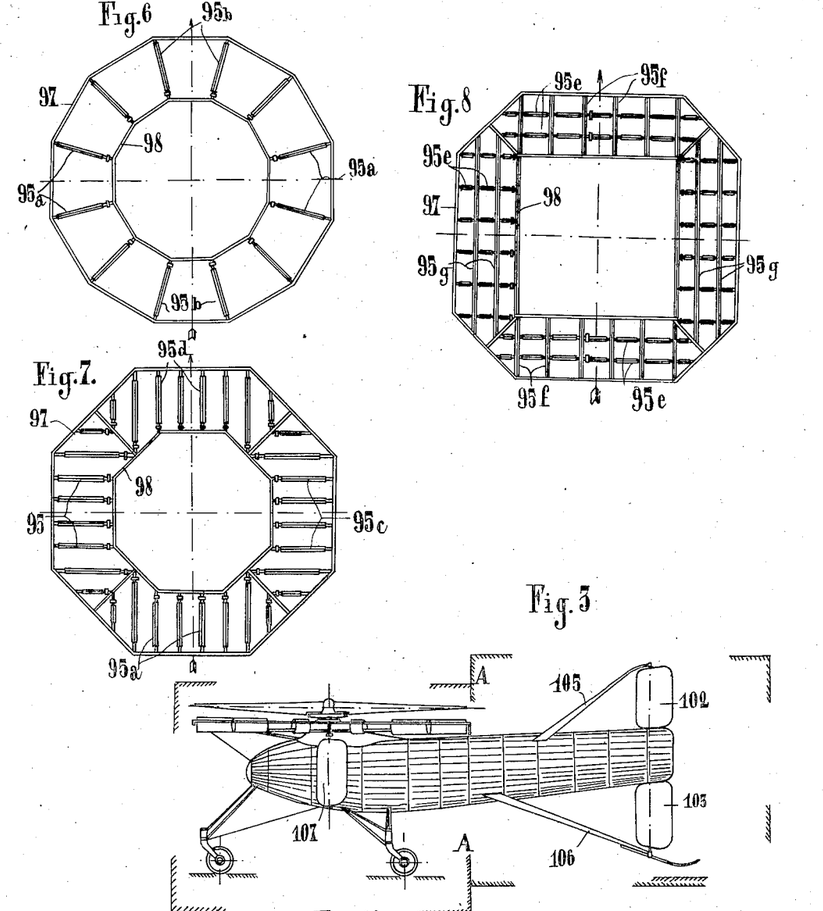
Figure 6 shows a radial arrangement of the blades of the deflector system.
Figure 7 shows a modification of the arrangement of the blades of the deflector system.
Figure 8 represents another modification of the arrangement of the blades of the deflector system.

Said deflector device may be constituted, for nonlimitative example, by a set of blades located above the screw or both above and below, but preferably below the screw. These blades may extend over the whole or only over a substantial portion of the surface swept by the screw blades, and they may be arranged radially, as shown by Figure 6, or be grouped in parallel rows, as shown by Figure 7, or else constitute a network according to two rectangular directions, as shown by Figure 8, or again be grouped in any other equivalent manner. Adjustment of the deflector's action may be obtained through slanting the blades so that they may offer an adequate incidence to the air currents flowing through the screw. Such slant may be obtained, for instance, by swinging all or some of the blades round spindles approximately perpendicular to the axis of rotation of the screw (see Figures 1, 6, 7, 8, and 14).

2. In order to enable the pilot to set the machine for vertical lift and to steer it during horizontal flight, the combination of the screw provided with its deflector device with a control system, hereafter termed the "setting control", operated by the pilot, and whereby he is afforded means to intensify or to moderate the action of the deflector system so as to obtain rotation of the fuselage either in the direction of the rotation of the screw or in the opposite direction. Said control may be constituted, for instance, by a swingletree operated by the pilot and adapted to increase or decrease the incidence of all or of some of the deflector blades with relation to the air currents acting thereon (see Figures 14, 16, 17).

3. For the purpose of permitting of the machine reaching high horizontal translation speeds at the pilot's discretion, the combination of the screw and associated deflector device with an "ahead" control system, operated by the pilot and adapted to permit for instance, of each deflector blade being set so as to offer itself under a hereinafter defined angle of incidence to the air currents that flow through it when the machine is flying fast ahead. Said angle of incidence should be so predetermined for the set of deflector blades as to avoid rotation of the fuselage. In this way, the air is directed in streams towards the rear of the machine and the reaction on the deflector blades produces a push ahead which ensures translation. The pilot can, besides, intensify said push by keeping, during translation, the axis of the screw at such a slant that the lifting push will offer a propelling component. If no importance is attached to setting during vertical lift, the so-called ahead control may be used alone, in which case the machine should have the end of the fuselage fitted with a vertical tail adapted to ensure steering stability during flight ahead. The same would be the case, for instance, with a helicopter held captive aloft and exposed to wind action (see Figure 18). If, on the contrary, setting during vertical lift is deemed important, I combine the so-called setting control and the so-called ahead control by means of a device which may be termed a "set and drive combiner". Said combiner may be constituted for instance, by a lever the ends of which will be operated by the ahead control or by the setting control and the pivot of which will, in its turn, operate the deflector system (see Figures 16, 17, part 127). To the latter combination, the above mentioned fuselage vertical tail may be added, steering during flying fast ahead being thereby facilitated.

Figure 2:
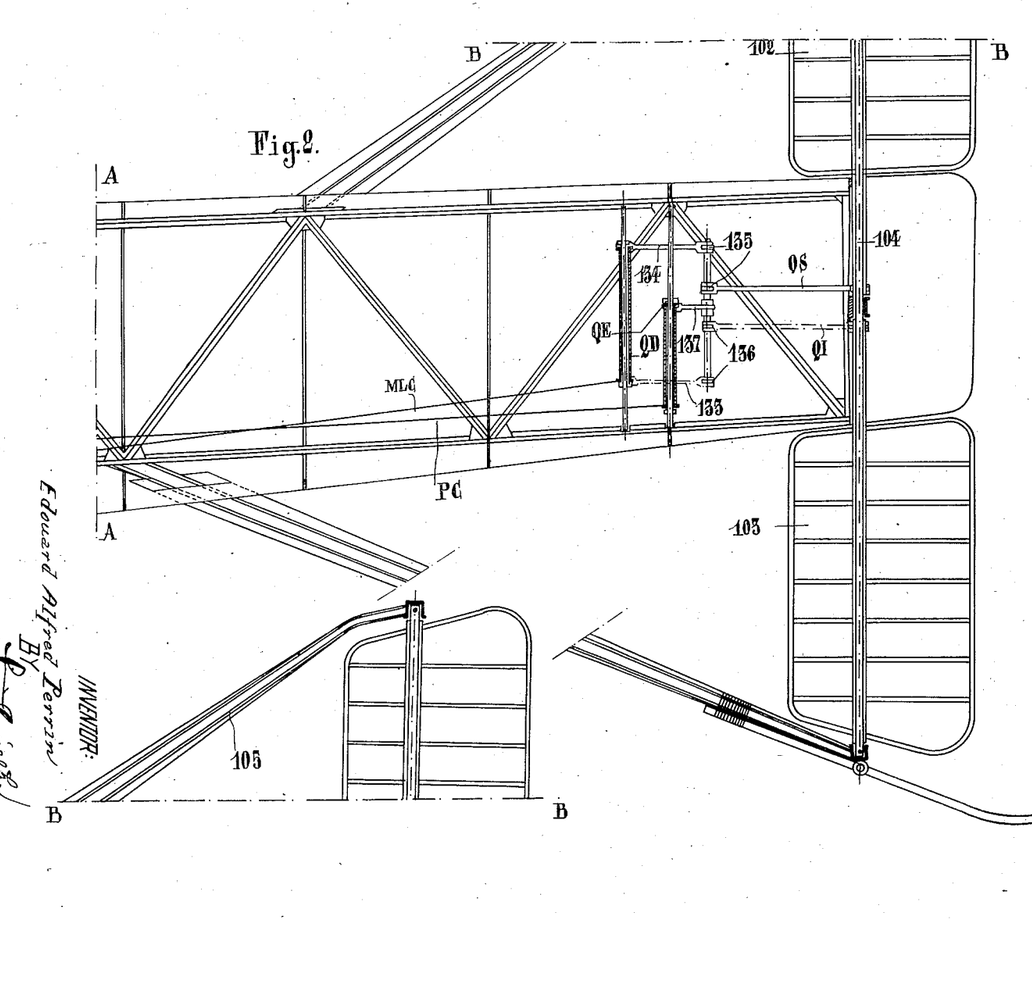
Figure 2 is a longitudinal section of the rear-part of the same machine.

4. A requisite, when the machine is flying fast ahead, is to neutralize the transverse reversing torque which occurs due to the fact that the screw blades assume unequal velocities with respect to the ambient air when they pass from one to the other side of the fuselage. For the purpose of neutralizing said reversing torque, the improved machine, may, optionally, comprise, in combination with a lifting or supporting screw provided with its deflector device and, optionally, with the pilot operated controls (setting control, ahead control or set and drive combiner) a differential tail operated by the pilot. Said differential tail would be constituted, for instance, by two vertical surfaces positioned at different levels at rear of the fuselage (see Figures 2 and 3).

The pilot operated control should be designed in such a way that when the upper surface is swung, say, from right to left, the lower surface is swung from left to right. In this manner, when the machine is flying fast ahead, the upper surface will undergo an air push in, say, right to left direction and the lower surface a left to right push. Together these two pushes constitute a torque which neutralizes the transverse reversing torque acting on the screw. An equivalent result could, indeed, be obtained by means of two surfaces horizontal or inclined with respect to the fuselage. The differential tail control may, optionally, be combined with the deflector operating ahead control so that the pilot may have but a single control to handle.

5. The differential tail device hereinabove described involves a drawback, the efficiency of the screw being unfavourably affected by the variations in its working caused by rapid translation of the machine. Moreover the blade of the screw whose inherent velocity is added to the translation speed, opposes a greater resistance than the opposite blade and, as a whole, the screw offers a drag which brakes the motion produced by the deflector blades set in ahead position and leads the pilot to bank the machine even more. In order to avoid said drawback, there may be substituted for the differential tail a device enabling the pilot to obtain a periodical transverse variation of the pitch of the screw blades. Said device is so designed that the pitch of a screw blade is decreased when to the velocity of the blade there is added the translation speed, and that, on the contrary, the pitch of the blade is decreased when, in the diametrically opposite sector, the translation speed is deducted from the velocity of the blade. The pilot operated control should be designed in ratio of the speed required of the machine, in order that the reversing torque may be neutralized as accurately as possible and, consequently, so that during rapid translation the screw blades will undergo substantially the same vertical air push on the left and on the right of the machine.

The blade pitch transverse varying device may be constituted, for nonlimitative example, by a lever (see Figures 1, 9 and 13, parts 76, 77) perpendicular to the axis of rotation of the screw and taken along by the latter in its rotary motion, but adapted to be positioned eccentrically with respect to the longitudinal axis of the screw and, hence, of the machine, this eccentric adjustment being controlled by the pilot. The ends of the lever are connected by means of two small connecting rods with two vertical rods rigidly secured with the blades and, as inspection of Figures 9, 10, 11 will show, after such eccentric adjustment, the pitch of the blades is increased, say, on the right and decreased on the left as compared with the value which it had previous to the adjustment. The control for this pitch variation may optionally be combined with the deflector operating ahead control, as hereinbefore indicated.

6. The pitch variation device described under paragraph 5 is not free from inconveniences, and those inconveniences develop as the translation speed of the machine becomes more and more rapid. A time would then come when said device would be incapable of properly offsetting the transverse reversing torque exerted on the screw due to rapid translation of the machine. In order to remedy said inconvenience, the machine may optionally comprise both the differential tail and the screw blade pitch transverse periodical variation device, together with their pilot operated controls, as well as the variable pitch lifting or supporting screw and its deflector, and, optionally, the pilot operated deflector controls (setting, ahead, and combiner).

The pilot operated controls of the differential tail and of the screw blade pitch transverse periodical variation device may be separate or united, but I consider it preferable to connect them by means of a gradual combiner system. This system is so designed that the differential tail will always be controlled with the same positiveness but that the pitch variation device will exert the less effect the faster the translation speed at which the machine is driven.

Such a gradual combiner system may be embodied, for nonlimitative example, (see Figure 16, parts 116, 117), in a lever the rocking of which is operated by the pilot and the end of which actuates the differential tail controls, which the pitch variation device is controlled by a roller moving along a groove running from the fulcrum to the pilot operated lever end. At high translation speeds, said roller will be brought back right opposite the pivot of the lever and, therefore, unaffected by the pilot's shiftings of the lever.

7. The deflector control described under paragraph 2 involves certain inconveniences also, losing some of its efficiency when the translation speed of the machine becomes very high. As a matter of fact, the slant of the deflector blades located on the right and on the left sides of the machine with respect to the vertical increases rapidly as the horizontal translation speed of the machine increases and, therefore, the air action on said blades gradually opposes the lifting or supporting effect of the screw while becoming less and less efficient for setting and steering purposes. In order to remedy this drawback, the machine may optionally comprise, in combination with the screw, its deflector device and its setting control, a settable tail forming a vertical rudder and operated by the pilot so that the steering action exerted by the air on said tail will counterbalance the tendency to rotation of the fuselage. The pilot operated settable tail control may be separate from the deflector blade setting control or be united therewith, but I prefer to connect them by means of a gradual combiner analogous to the one described under the next preceding paragraph and adapted to operate with constant positiveness the settable tail while operating in a gradually reduced manner the deflector blade setting control as the machine is being driven faster and faster (see Figure 16, parts 122 and P).

On the other hand, in the combinations involving employment of the differential tail as described in paragraphs 4 and 6, I prefer to use said differential tail for the duty hereabove ascribed to the settable tail. For this purpose, the machine may comprise a device adapted to combine the joint motions and the differential motions of the two surfaces that constitute said differential tail. Such a combiner device is so designed that, in order to set the machine, the pilot will, instead of operating the settable tail described under the foregoing paragraph, cause to be turned simultaneously and in the same direction the two surfaces that constitute the vertical differential tail, without, however, interfering with or precluding the possibility of their being differentially operated as described under paragraph 4. As a nonlimitative example, such a combiner device may be constituted (see Figures 2 and 16, parts Q, D, 135 and 136) by a group of three levers the description and operation of which will be hereinafter set forth, and which enable the pilot either to operate simultaneously and to an equal extent the two differential tail surfaces, or to operate said two surfaces simultaneously but in opposite directions.

Lastly, the setting action of the settable tail (or of the differential tail as a whole) requires as a counterpart a horizontal action equal (and in contrary direction) to the action which the air exerts on the tail (whether the settable tail or the differential tail). Said air action is normally exerted on the fuselage approximately opposite the axis of the screw. In order to decrease drag, there may optionally be arranged in said region on either side of the fuselage two vertical tapered fins (see Figures 1, 3 and 4, part 107) the action of which on air will be advantageously substituted for that of the fuselage. The control of said fins should obviously be integral with the control of the settable tail (or of the whole differential tail) the swinging directions being inverse for the fins and for the tail.

8. With the foregoing combinations, no special provision is made for stability of the machine. In the case of captive helicopters (see Figure 18) inertia of the gyroscope which the screw constitutes, joined with the oscillation damping produced by the air flow through the deflector, suffice to ensure stability of the machine while climbing. The same does not obtain with a machine intended for free flights and, in this case, I prefer to combine the devices described above under paragraphs 1 to 7 with the hereinafter described devices calculated to ensure longitudinal stability and transverse stability of the machine under the pilot's control. Said stabilizer devices are based on a principle of gyroscopic order, for gyroscopic inertia phenomenons preponderate in a single-screw helicopter. The fundamental property of the gyroscope taken advantage of with the devices which are the subject of my invention is the following one, to wit: when a torque from forces exerted perpendicularly to the plane of rotation is applied to a gyroscope, said gyroscope reacts in taking a precession motion, that is to say it is rotated around an axis situated in its rotation plane and in the plane formed by the forces of the disturbing torque. The precession velocity is proportional to the torque power.

Said property renders it possible to obtain longitudinal stability of the machine under the pilot's control. All that is required is that the pilot be enabled to make ambient air exert on the machine a torque which acts in the transverse plane of the machine; the action of such a transverse torque will cause a rotation in the horizontal plane of the gyroscope screw and, consequently, the pilot will be enabled to keep the machine in any position horizontal or at a slant. The means utilized to make ambient air exert a transverse torque on the machine were hereinbefore described under paragraphs 4, 5 and 6. It will be sufficient, therefore, that the pilot moderates or intensifies the action of the devices designed to oppose the transverse reversing torque (differential tail, transverse pitch variation), in order to put up or down at will the nose of the machine. The machines which are the subject matter of my invention may, therefore, optionally comprise the combination of the devices constituting the combinations described in paragraphs 1 to 7, and, more especially, as per paragraphs 4, 5 and 6, with a pilot operated longitudinal stabilizer control. Said control will act concurrently with the controls on the differential tail or on the screw blade pitch variation device, or may be united therewith as indicated in paragraph 6.

9. In order to obtain transverse stability of the machine, the pilot must be able to cause the ambient air to exert on the machine a torque from forces which act in the longitudinal plane of the machine. For this purpose my invention comprises, together with the devices described in paragraphs 1 to 8, a device adapted to permit of the pilot obtaining a periodical longitudinal variation of the pitch of the screw blades. Said device, analogous to the one described in paragraph 5 in reference to transverse variation of pitch, increases the pitch of a screw-blade as the latter passes through the plane of the fuselage and correspondingly decreases the pitch of the opposite blade. Control of the longitudinal pitch variation may be effected, for nonlimitative example, by eccentrically adjusting the lever described under paragraph 5 (see Figures 9, 12, 13 and parts 76 and 144), in the direction transverse to the fuselage, the operation being analogous to the one described.

Also, the action of the longitudinal pitch variation device may optionally be combined with the action of the horizontal rudder or elevator (located on the fuselage) in a manner similar to the combination of the transverse pitch variation device with the differential tail (see paragraph 6).

10. As was explained in paragraph 8, the gyroscopic precession motion of the stabilizer is in ratio of the intensity of the stabilizing torque brought about by the pilot. But said precession motion produces also, due to ambient air resistance, a torque from forces of the aerodynamic order (the plane of which is perpendicular to the plane of the forces exerting the stabilizing torque). It may, therefore, be unnecessary to neutralize the action of said torque which obviously does parasitic duty. The machine according to my invention may, therefore, optionally comprise, in addition to the features described in paragraphs 1 to 9 hereinbefore, an aerodynamic correction device. Said device is so designed that in order to obtain, say, longitudinal stability, the pilot is enabled to impose at one and the same time on the machine a torque from forces acting in the transverse plane of the machine (as described under paragraph 8) and also a corrective torque from forces acting in the longitudinal plane of the machine and equal as to intensity to the aerodynamic torque intended to be neutralized. Likewise, when the pilot desires to cross-stabilize his machine, the aerodynamic stabilization device is so designed that on the stabilizing torque acting in the longitudinal plane of the machine (as described under paragraph 9) there will be superimposed a corrective torque from forces acting in the transverse plane of the machine. Said corrective torques generally are of far less intensity than the stabilizing torques. For nonlimitative example, said aerodynamic correction device may comprise (see Figures 16 and 17, parts 138 and 139) in a pilot operated vertical control rod, rigidly connected to two horizontal bars arranged longitudinally and transversely to the fuselage. On these bars are adapted to move the heads of two vertical connecting-rods connecting the pilot operated lever with, respectively, the control for longitudinal stabilization and the control for transverse stabilization. When the connecting rods are at the center of the horizontal control bars, the pilot, operating the lever in, say, the longitudinal plane of the machine, actuates only the vertical connecting rod located in the longitudinal plane but this no longer occurs if the connecting-rods are shifted from mid-way position, and, in the latter case, if the pilot operates the lever in the longitudinal direction he will actuate the longitudinal vertical connecting-rod but he will also actuate the transverse vertical connecting-rod somewhat, thereby effecting the aerodynamic correction.

11. Lastly, the machine according to my invention may comprise various groups of screws or propellers provided with the devices described in paragraphs 1 to 10 hereinbefore, mounted on a single fuselage or arranged on fuselages integral with one another (see Figure 19). If all said screws or propellers revolve in the same direction, the system of fuselages has to bear only the vertical stresses put thereon by the loads lifted and by the stabilizing or balancing torques caused by the pilot. If, on the contrary, certain screws or propellers have to revolve in the opposite direction from others, the fuselage system will have to absorb the gyroscopic and aerodynamic reactions of the screws on one another, which means heavier weight. But, even in this case, importance may attach to adoption of the above described devices in order to ensure in a simple and efficient manner the setting and the steering of the whole machine.

In the drawings appended hereto Figures 1 to 20, show, as nonlimitative examples, embodiments of the devices that constitute the machine and of which the general characteristics have been hereinbefore set forth.

In said drawings:

Figures 1ᵃ and 1ᵇ jointly form a longitudinal section of the fore-part of a single-screw fast-flier helicopter.

Figure 3 is a side view of the same machine, it constitutes also an assembly of Figures 1ᵃ, 1ᵇ and 2.

The meaning of the abbreviations is as follows:

CA stands for ahead control.

PV stands for variable control of the steering swingletree.

MIC stands for constant control by joystick, longitudinal direction.

MIV stands for variable control by joystick, longitudinal direction.

MT stands for constant control by joystick, transverse direction.

$R^1$ and $R^2$ stand for starting point of the deflector system control combination.

RA, RB, RC, RD stand for points reached by the controls of each group of blades of the deflector system.

V stands for points reached by the controls of the vertical side fins.

QE stands for starting point of the controls of the whole of the surfaces of the differential tail.

QD stands for starting point of the set of differential controls of the tail.

QS stands for point reached by the controls of the upper surface of the tail.

QI stands for point reached by the controls of the lower surface of the tail.

$OT^1$ and $OT^2$ stand for starting points of the combination of the controls of the screw-blade pitch periodical transverse variation system.

OT stands for point reached by the control of the screw-blade periodical transverse variation.

OL stands for point reached by the control of the screw-blade periodical longitudinal variation.

The same abbreviations are used and have the same meanings on Figures 1, 2, 13, 14, 16 and 17.

In the embodiment illustrated by Figures 1 to 5, the engine 50, optionally provided with a flywheel 51, drives, through bevel gearing 52, 53 the vertical propeller shaft 54. This transmission is effected through a ratchet system the purpose of which is to allow the engine, when working, to drive the propeller or screw and, per contra, in the event of the engine failing, to permit the screw to continue revolving in the direction indicated by the arrow (Figure 5), the pitch of said screw being then reduced by the pilot to a value sufficient in order that said screw will, by self-rotation, brake the descent of the machine.

Figure 20:
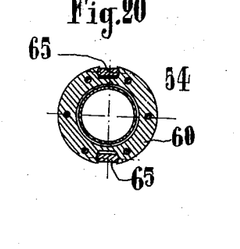
Figure 20 is a horizontal section according to line G—G of Figure 1.

The ratchet system is composed of a circular rack 55 rigidly attached to gear 53, and a pair of pawls 56 influenced by springs 57 and articulated on two cheeks 58. Said cheeks are integral with a sleeve 59 concentric with propeller shaft 54. Said sleeve 59 has its lower part ended by a crown 60 (see Figure 20) formed with two diametrically opposite notches. At its upper part, sleeve 59 is terminated by a ball thrust bearing 61 which distributes on cross-pieces 62 and thence to the framework of the fuselage the upward or supporting stress of the screw. Said supporting stress or effort is taken from shaft 54 by a key connection 63 and a thrust piece 64 bearing on crown 60.

The driving stress of the screw is taken from crown 60 (Figure 20) by the heads 65 of two levers 66, the common spindle 67 of which consitutes a key connection on propeller shaft 54. Levers 66 are provided at their lower ends with rollers 68 that are engaged in two oblique grooves made in a sleeve member 69 concentric with propeller shaft 54. Member 69 is adapted for vertical shifting along propeller shaft 54 while, however, prevented from rotating with respect to the same. The vertical shifting is effected by a control which is also adapted to cause the pitch of each propeller or screw blade to be simultaneously varied by the same amount. Said control is operated by the pilot and constituted by levers 70 and 71 and connecting-rod 72.

The pitch variation control works as follows:

Whenever the pilot causes member 69 to be shifted, say, upwards, roller 68 is moved leftwards and thereby lever heads 65 are shifted to the right with respect to fulcrum 67. The result is an angular shifting as between sleeve 59 and propeller shaft 54 whether the latter is rotating or not. The relative motion of sleeve 59 with respect to propeller shaft 54 is transmitted by a key 73 (Figure 5) to a central shaft 74. For this purpose, key 73 runs through propeller shaft 54 through an oval hole. The relative motion of shaft 74 with respect to propeller shaft 54 is transmitted at the upper part to a U-shaped crank 75 which is let through shaft 54 through two oval holes and which is tightly fitted into shaft 74. The upper part of said crank 75 actuates cross-piece 76 controlling variation of the pitch of the screw blades.

As has been hereinbefore explained, cross-piece 76 is adapted to be shifted, at the pilot's discretion, into eccentric position with respect to propeller shaft 54, but the U shape of crank 75 permits, whatever the degree of eccentricity, cross-piece 76 to follow shaft 74 in all its relative rotary motions with respect to propeller shaft 54. The result is that when the pilot causes member 69 to be moved upwards, cross-piece 76 will undergo a relative angular shifting motion with respect to propeller shaft 54. This motion will be transmitted through lateral arms 77 (see Figures 9, 10 and 11) to small connecting-rods 78 and to the heads 79 of two pins rigidly fixed to the screw-blades 80. These blades will then revolve in inverse directions and to the same extent round a tubular hub 81 set in the head of propeller shaft 54. It will, therefore, be apparent that the pilot is enabled by operating control 72 to cause the pitch of screw-blades 80 to be varied without hindering the screw or propeller revolving.

Propeller shaft 54 is supported by means of a shoulder 82 bearing on cross-pieces 62 rigidly secured to the framework of the fuselage. It is guided at its upper part by a collar 83 also secured to the framework of the fuselage.

The blades 80 of the screw, which are held against the action of centrifugal force by thrust-blocks 84 resting on shoulders 85 of hub 81, are constituted by a central spar 86 (see Figures 1, 10 and 11) provided with ribs 87 on which are secured tapered surfaces 88.

When the machine is volplaning down with the engine idling, the propeller being self-revolving and, consequently, pawls 56 slipping over the teeth of ratchet 55, the pilot is enabled, by increasing the pitch of the screw blades to obtain an extra supporting effort and to effect the landing of the machine at a remaining velocity as reduced as he likes.

The landing chassis or under-carriage is constituted by a set of three wheels 89, a front one and two side ones. Said wheels are automatically settable and connected with the framework of the fuselage by triangular double brackets 90, 91, which can be positioned by means of cables 92 (see Figure 4).

The framework of the fuselage enclosed the cockpit, as usual, said cockpit being braced by rings 93 secured to the framework and by stringers 94 connecting said rings.

The deflector device is constituted by blades 95 articulated on spindles 96 which are carried on two crowns, an outer crown 97 and an inner crown 98 (see Figures 1 and 14) connected with the fuselage by skew bars 99. Said skew bars are supported by ties 100 and counter-ties 101. The arrangement of the blades may be radial, as shown by Figure 6, or be constituted by sets of parallel blades, as shown by Figure 7, or else be made up of blades constituting a rectangular network, as shown by Figure 8. In the latter case, the inner crown should preferably be rectangular in order to facilitate construction. In the case illustrated by Figure 6 the blades will be actuated in a substantially uniform manner by the setting control. On the contrary the ahead control will take greater effect on blades 95$^a$ located on the right side and on the left side of the fuselage than on blades 95$^b$ located substantially on the axis of the machine; moreover, the positions taken by the blades under the influence of the ahead control will correspond to substantially symmetrical movements as concerns the diametrically opposite blades. In the case illustrated by Figure 7, the ahead control will take effect exclusively on blades 95$^c$ grouped in two sectors on the right and on the left of the machine, while the setting control may be made, at discretion, to take effect either only on the remaining blades 95$^d$ or on the whole number of blades 95$^c$ and 95$^d$. The first mentioned device offers the advantage of avoiding employment of the set and drive combiner, but is less efficient for setting purposes. Lastly, in the case illustrated by Figure 8, the ahead control takes effect exclusively on blades 95$^e$ perpendicular to the axis of the machine, while the setting control may take effect either on blades 95$^f$ only or on the whole number of blades 95$^e$—95$^f$; in this case, blades 95$^g$ are not operated.

The differential tail is constituted by two surfaces: an upper surface 102 (Figures 2 and 3) and a lower surface 103; said surfaces are articulated on a tube 104 supported by the rear part of the framework of the fuselage and the ends of which are carried by struts 105 and 106 bearing on said framework.

Figure 9:
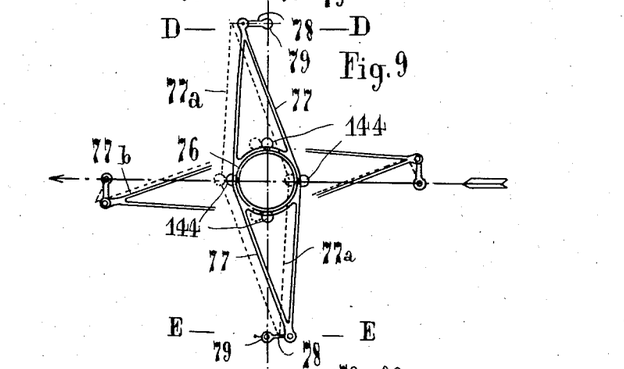
Figure 9 is a horizontal section according to line C—C of Figure 1.
Figure 10:
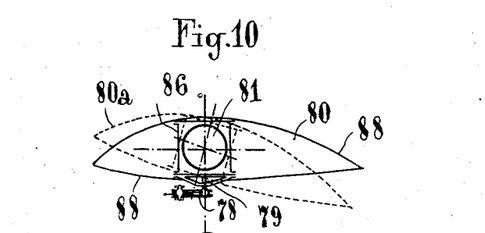
Figure 10 is a vertical section according to line D—D of Figure 9.
Figure 11:
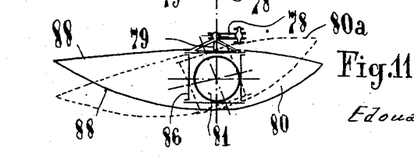
Figure 11 is a vertical section according to line E—E of Figure 9.

Periodical transverse variation of the pitch of the screwblades is obtained, as hereinbefore indicated, by positioning the cross-piece or member 76 (Figures 1, 9, 10 and 11) eccentrically with respect to propeller shaft 54; said positioning operation taking place in the direction of the axis of the fuselage, so that the arms or branches 77 connected to member 76 come to position 77$^a$ indicated by dotted lines in Figure 9. Owing to the play of small connecting-rods 78 and of pins 79, the screw-blades 80 come to dotted position 80$^a$ (Figures 10 and 11). As will be apparent, the pitch is increased on the right-hand side and decreased on the left-hand side of the fuselage. Obviously, the contrary would be the case were the eccentric positioning directed towards the rear of the machine. On the other hand, when the screw-blades are in the direction of the fuselage, branches 77 come to the position 77$^b$ indicated by dashes, and Figure 9 shows clearly that the positioning has then no effect on the pitch of the screw-blades. As a whole the device does, therefore, produce periodical transverse variation of the pitch of the screw-blades.

Figures 1A, 4:
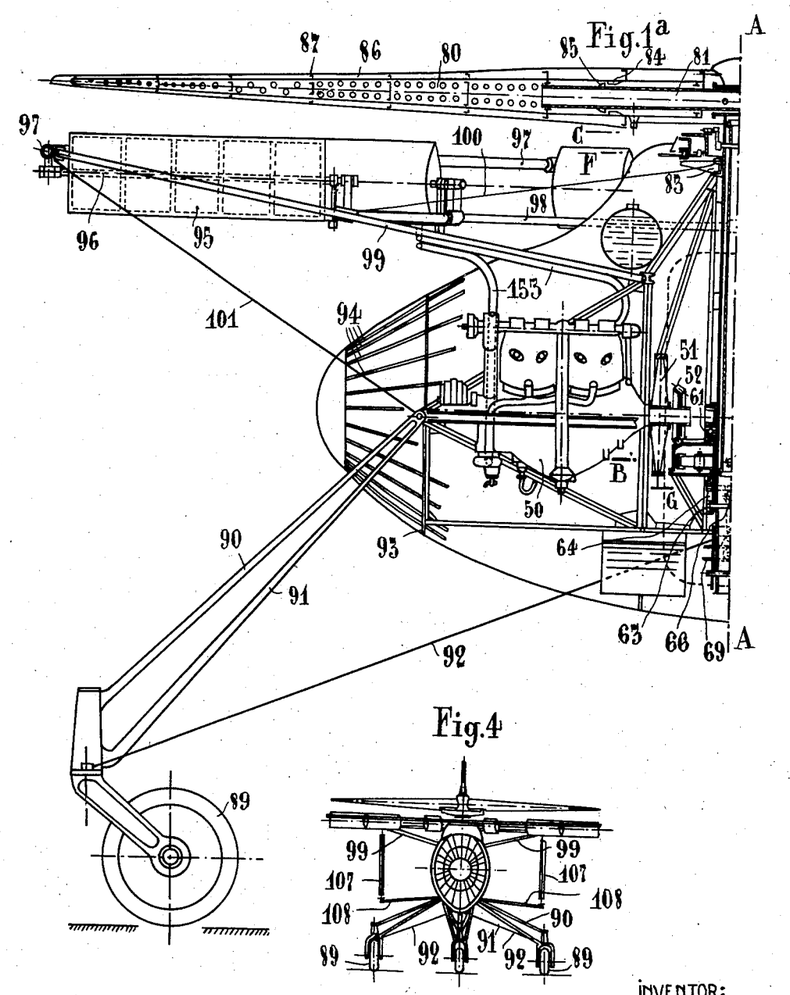
Figure 4 is a view of the nose end of the machine.
Figures 1B, 5:
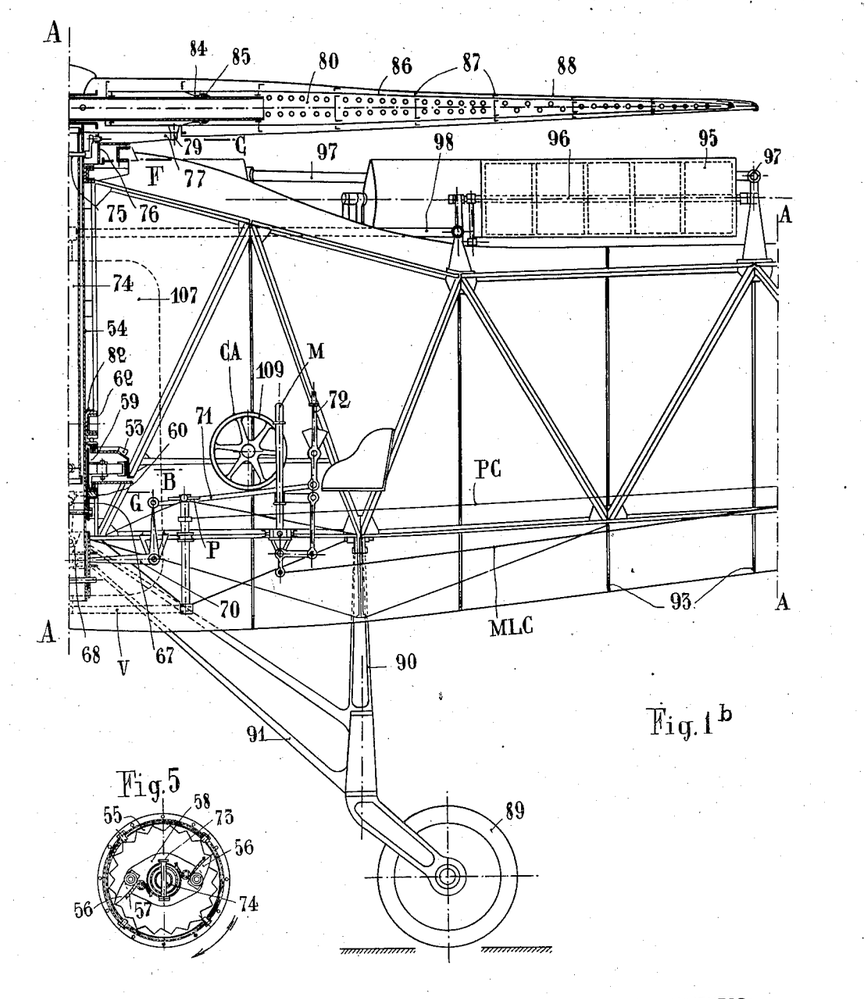
Figure 5 is a horizontal sectional view on line B—B (Figure 1) of the vertical power transmission from the engine to the screw.

Lastly, the two vertical fins are constituted by two surfaces 107, indicated by dotted lines in Figure 1, and represented in side and front view, respectively, in Figures 3 and 4. Said surfaces are hung on the inner crown 98 of the deflector system. On the other hand their lower parts are held by supports 108 (Figure 4).

Figure 15:
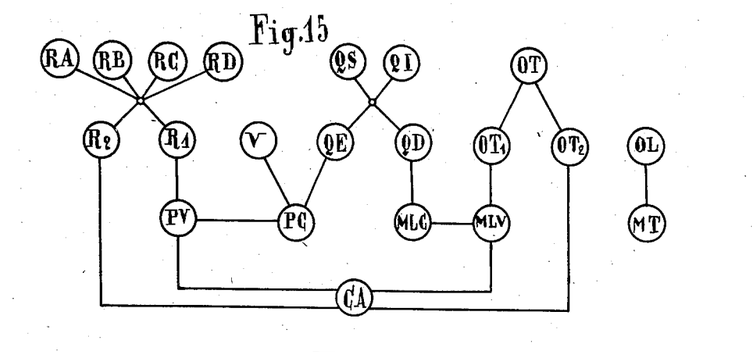
Figure 15 shows a general diagram of the controls for a single-screw helicopter as defined by Figures 1 to 4.
Figure 16:
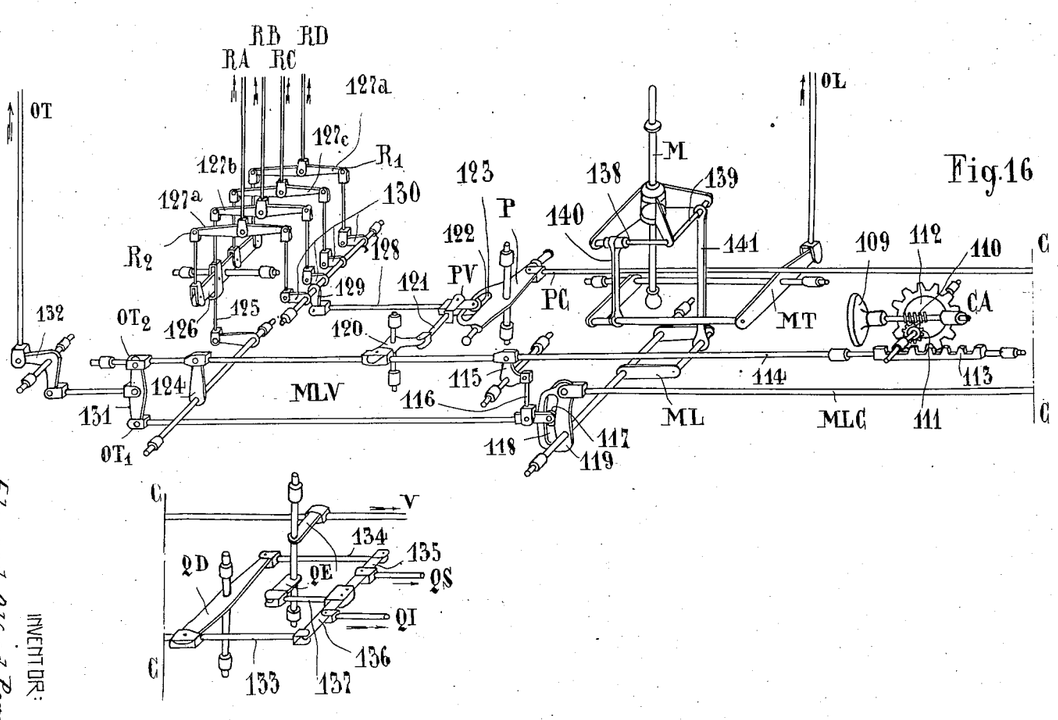
Figure 16 is a diagrammatic perspective view of the embodiment of the various controls of the machine as shown by Figures 1 to 4 and of which the general diagram is illustrated by Figure 15.

The various controls hereinbefore described are combined according to the general diagram shown by Figure 15, of which Figure 16 illustrates an embodiment as a non-limitative example. Looking at the diagram on Figure 15, it will be seen that the pilot operated ahead control CA takes action both on the deflector system R$^2$ and on the transverse pitch variation control OT$^2$. On the other hand, it causes to be varied from maximum value down to a minimum value which may be 0, the action of the swingletree P (Figure 16) and connection PV (Figures 15 and 16) and the lateral action of the joystick M (Figure 16) and connection MLV (Figures 15 and 16). The swingletree operates in a variable manner the deflector (connection PV to R¹, Figure 15), and it operates in a constant manner the vertical side fins (connection PC to V) and both surfaces of the differential tail (connection PC to QE). Acting in the longitudinal direction, the joystick operates in a constant manner the differential tail control (connection MQC to QD) and in a variable manner the transverse pitch variation control (connection MLV to OT⁴). Lastly, acting in the transverse direction, the joystick operates the longitudinal pitch variation control (connection MT to OL). The actions of the swingletree and of the ahead control on the deflector system R¹, R² are combined by the set and drive combiner, and said actions control the various blades of the deflector system (connections R¹ and R² to RA, RB, RC and RD). The general and differential controls of the tail are combined to control the upper surface and the lower surface (connections QE and QD to QS and Q¹). Lastly the controls of the transverse pitch variation from the joystick and from the ahead control become added to one another (connections OT¹ and OT² to OT).

In the embodiment illustrated by Figure 16, the handwheel 109 (Figures 1, 16 and 17) of the ahead control CA is pilot operated. It acts through a worm 110 on a worm wheel 111 and a pinion 112 the latter actuating a rack 113 and a rod 114.

Rod 114 operates successively a bell crank 115 and a connecting rod 116 so as to move a roller 117 (on the end of control MLV) up and down a groove or slot 118 in a plate 119 rigidly connected to control ML (which is actuated by the pilot operating the joystick in longitudinal direction). The device made up of parts 115, 116 and 119 constitutes the gradual combiner described previously under paragraph 6. As will be apparent, the differential control QD of the tail is operated in a constant manner by the pilot, while the pitch variation connection has its control MLV reduced little by little as the pilot operates handwheel 109.

Rod 114 next operates a bell crank 120, connecting rod 121 and roller 122 on the end of control PV which constitutes the setting control. Roller 122 moving along groove or slot 123 of the swingletree P, the latter exerts less control on the setting system the more the pilot operates handwheel 109.

Rod 114 next operates a lever 124 and a connecting rod 125, thereby gradually rocking lever 126 which constitutes the ahead control in relation with the deflector system. Lever 126 controls the left end of a series of levers 127ᵃ, 127ᵇ, 127ᶜ, 127ᵈ, which constitutes the set and drive combiner provided for under paragraph 3. The central parts of levers 127 control the group of deflector blades (controls RA, RB, RC and RD). The other end of the levers is controlled in a gradually reduced, but substantially uniform, manner for the whole number of blades through control PV, connecting rod 128 and levers 129 and 130.

Rod 114 lastly operates at OT² the combiner lever 131, the center of which controls the bell crank 132 and the control OT for the transverse pitch variation of the screw blades variation. The lower end OT¹ of lever 131 is operated in a gradually reduced manner by control MLV.

The device adapted to combine the movements of the differential tail, as provided for in paragraph 7, is operated, on the other hand, by lever QD actuating in inverse directions connecting rods 133 and 134 (Figures 2 and 16) whereby levers 135 and 136 operate in inverse directions the controls QS and QI of the upper and lower surfaces or members 102 and 103 of the tail. On the other hand, control PC operates lever QE, connecting rod 137 and, thereby, in the same direction controls QS and QI.

Acting in the transverse direction, the joystick operates lever MT and control OL for the longitudinal pitch variation of the screw-blades.

The aerodynamic correction device comprises the two horizontal bars 138, 139 rigidly connected to joystick M. On said bars are adjustably mounted vertical connecting rods 140 and 141, the shifting of which relative to their mean position produces the aerodynamic correction described in paragraph 10.

Figure 17:
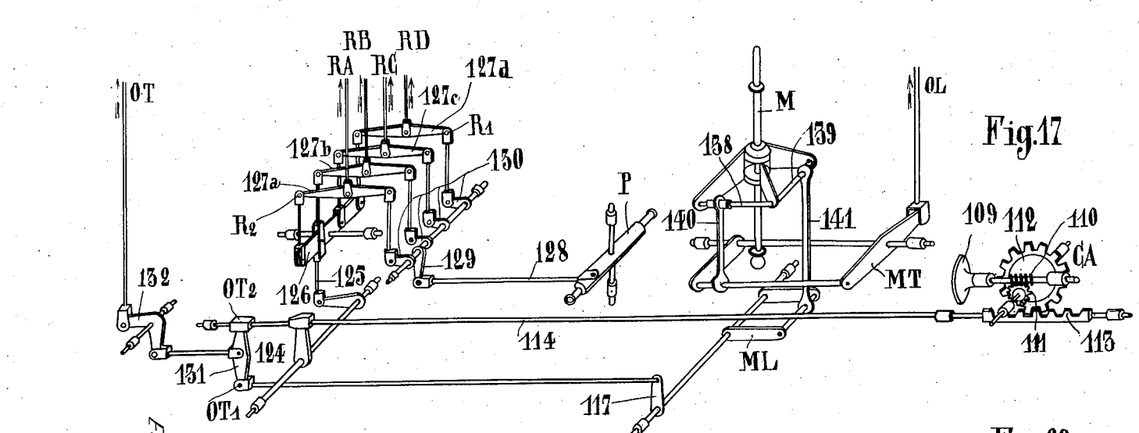
Figure 17 is a diagrammatic perspective view of the various controls for a captive machine provided with a fixed tail and devoid of vertical side fins.
Figure 18:
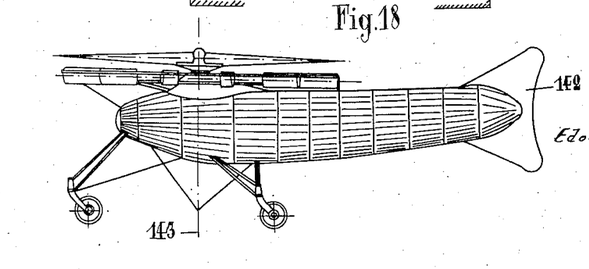
Figure 18 is a side view of the above-mentioned captive helicopter.

Figure 17 shows a group of controls analogous to the foregoing one but arranged for operating a captive helicopter provided with a fixed vertical setting tail 142 (Figure 18), the holding rope being indicated at 143. In the example shown by Figure 17, the gradual combiner, the vertical fin control and the combiner system are done away with. On the other hand, the setting system, ahead control, and setting and driving devices, as well as the transverse and longitudinal pitch variation devices are retained. The reference characters are the same as on Figure 16.

Figure 12:
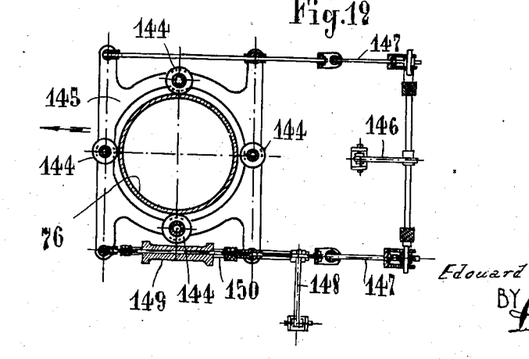
Figure 12 is a horizontal section according to line F—F of Figure 1.
Figure 13:
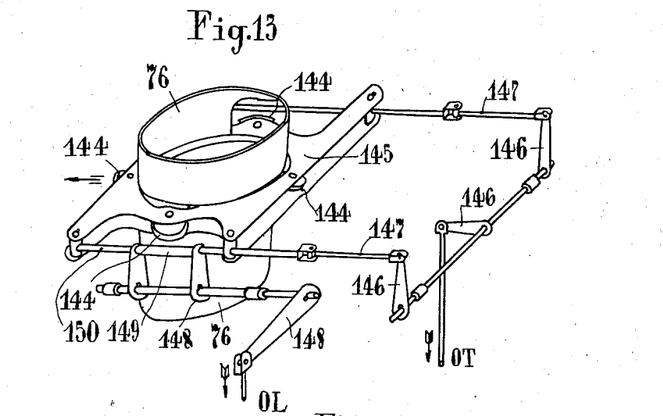
Figure 13 is a perspective view of the pitch-varying (transverse or longitudinal) device shown in Figure 12.

Figures 12 and 13 show as a nonlimitative example an embodiment of the control for the transverse and longitudinal pitch variation devices. For this purpose, the crosspiece 76 is held by four rollers 144 (Figures 9, 12 and 13) which are carried by a frame 145. When the pilot operates control OT (see Figures 13, 16 and 17) which controls the transverse pitch variation, he actuates a lever 146 and two connecting rods 147, thereby moving frame 145 to eccentric position longitudinally of the machine. This produces the transverse pitch variation as above described and as apparent from Figures 9, 10 and 11.

On the other hand, when the pilot operates control OL (Figures 13, 16 and 17) which controls the longitudinal pitch variation, he actuates lever 148, the sleeve or sheath 149 of which slides on the extension 150 of one of the connecting rods 147. Frame 145 follows the movement and crosspiece 76 is thus moved to eccentric position transversely of the machine, whereby the longitudinal variation of the screw-blade pitch is obtained through a mechanism analogous to the one above set forth in reference to transverse variation. Indeed, Figure 15 makes it apparent that the transverse positioning operation is possible regardless of the extent of the longitudinal positioning, and vice versa.

Figure 14:
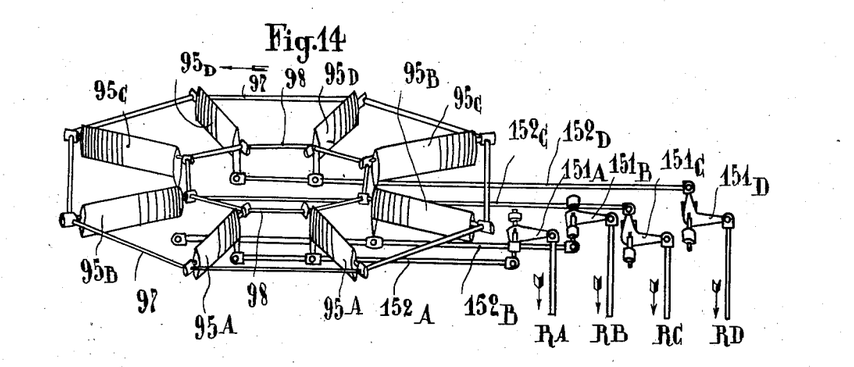
Figure 14 is a diagrammatic perspective view of a control device for the radial blades of a deflector system.

Figure 14 illustrates as a nonlimitative example, an embodiment of a control for the radial blades of the deflector system. Controls RA, RB, RC and RD (Figures 16 and 17) from the set and drive combiner system are connected with levers 151A, 151B, 151C and 151D. Said levers control respectively connecting rods 152A, 152B, 152C, and 152D which respectively swing blades 95A, 95B, 95C and 95D. If the pilot operates the swingletree, all the controls RA, RB, RC and RD are moved down by the same amount and the deflector blades are swung through substantially the same angle and in the same direction. If, on the contrary, the pilot operates ahead control CA (Figures 16 and 17) controls RA, RB are moved upwards, control RB being less shifted than control RA; controls RC and RD are simultaneously drawn downwards, control RC less than control RD. The deflector blades follow the same movement, the transverse blades being less actuated than the longitudinal blades, and the whole number of blades on the right side being actuated in an inverse direction to (that is to say, substantially symmetrically to) the whole number of blades on the left side.

Figure 19:
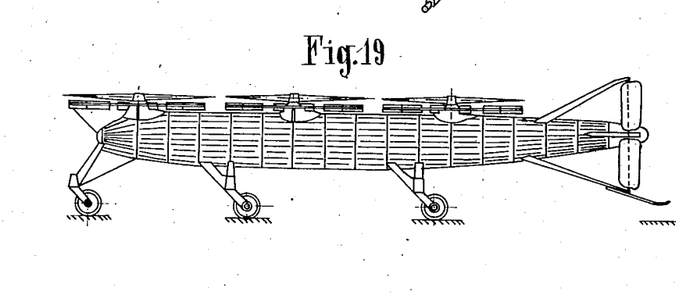
Figure 19 is a side view of a helicopter fitted with three screws or propellers, each one of which is provided with a deflector system and which are all mounted on a common fuselage.

Lastly, Figure 19 illustrates, as a nonlimitative example a set of three screws or propellers with deflectors on one and the same fuselage.

By way of supplemental explanation, it may be stated that some of the deflector blades may be utilized as a radiator for the engine. This is the case illustrated by Figure 1 where the engine cooling water circulation pipes 153 lead to the deflector blades located in front of the machine, said blades being designed to do radiator duty and being preferable selected as being the ones the least interferred with by the setting and ahead controls.

Claims.

1. In a helicopter, a propeller shaft; a set of propeller blades thereon; a device for deflecting the air streams created by the propeller so as to avoid fuselage rotation; a control for effecting periodic variation of the pitch of said blades; and a differential tail at the rear of the fuselage for neutralizing the transverse reversing torque set up by the propeller.

2. In a helicopter, a propeller shaft; a set of blades thereon; a control for effecting periodic variations of the pitch of said blades; a set of blades for deflecting the air streams created by the propeller; a control for varying the action of the deflecting blades; and a common operating device for both controls.

3. In a helicopter, a single vertical engine-driven propeller shaft; a set of propeller blades fixed thereon; a control for effecting periodic variation of the pitch of said blades; a set of stationary, horizontally-pivoted deflector blades located below the propeller blades and extending both axially and transversely with relation to the fuselage; a setting control for varying bodily the inclination of the deflector blades; and a separate control for tilting the transverse deflector blades from the vertical to an approximately-horizontal position.

4. In a helicopter, a single vertical engine-driven propeller shaft; a set of propeller blades fixed thereon; a control for varying simultaneously the pitch of said blades; a control for effecting a periodic variation of the pitch of said blades; a set of stationary, horizontally-pivoted deflector blades located below the propeller blades and extending both axially and transversely with relation to the fuselage; a setting control for varying bodily the inclination of the deflector blades from vertical to an approximately-horizontal position; and a vertical tail pivoted vertically at the rear of the fuselage.

In testimony whereof I affix my signature.

EDOUARD ALFRED PERRIN.